United States Patent [19]

Francisco et al.

[11] Patent Number: 5,263,147
[45] Date of Patent: Nov. 16, 1993

[54] SYSTEM FOR PROVIDING HIGH SECURITY FOR PERSONAL COMPUTERS AND WORKSTATIONS

[75] Inventors: Emmanuel C. Francisco, Covina; Randy Saunders, Upland, both of Calif.

[73] Assignee: Hughes Training, Inc., Arlington, Tex.

[21] Appl. No.: 662,659

[22] Filed: Mar. 1, 1991

[51] Int. Cl.⁵ ...................... G06F 12/14; G06F 15/16
[52] U.S. Cl. .................................. 395/425; 395/725; 380/4; 364/DIG. 1; 364/286.4; 364/264
[58] Field of Search ............... 395/425, 575, 725, 650; 380/3, 4

[56] References Cited

U.S. PATENT DOCUMENTS

| | | | |
|---|---|---|---|
| 4,439,830 | 3/1984 | Chueh | 395/425 |
| 4,584,639 | 4/1986 | Hardy | 395/650 |
| 4,811,347 | 3/1989 | Bolt | 371/51.1 |

Primary Examiner—Debra A. Chun
Attorney, Agent, or Firm—Wanda K. Denson-Low

[57] ABSTRACT

A security system 31 for use with a base computer system 29 includes an access monitoring unit 100 for continuously monitoring all operations in the memory address space, the input/output address space, or both, of the base computer 1 in parallel with base computer execution. The access monitoring system 100 can include access monitoring memory tables which specify, for a given user, his read access and write access to data stored in the security system, in the base computer system or both.

8 Claims, 5 Drawing Sheets

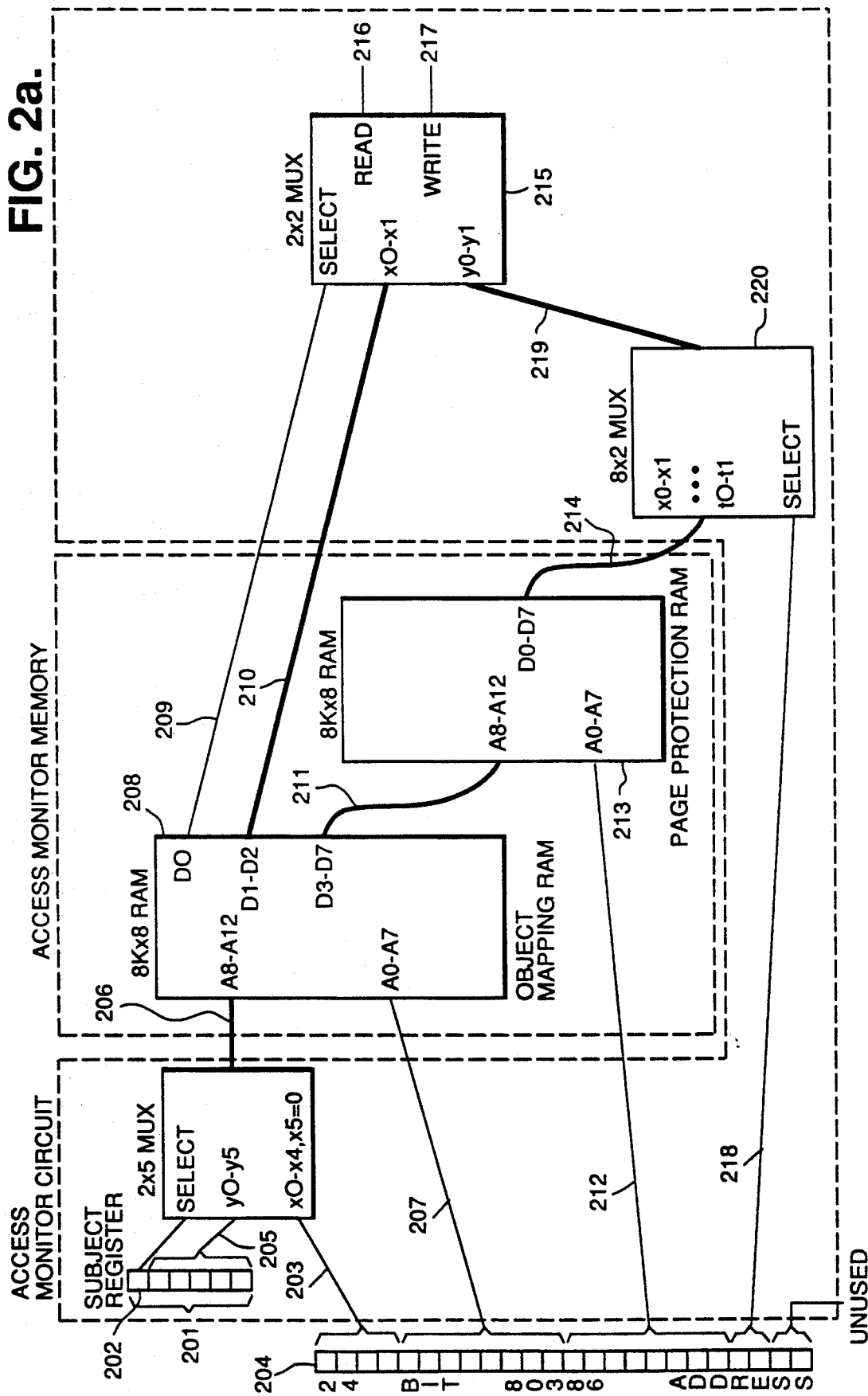

SYSTEM FOR PROVIDING HIGH SECURITY FOR PERSONAL COMPUTERS AND WORKSTATIONS

FIELD OF THE INVENTION

This invention relates to security systems that are adapted for use with conventional computer systems such as the IBM PC/AT compatible systems and that provide a high level of security for the user. More specifically, this invention relates to certain hardware and software for making a secure computer system.

DESCRIPTION OF RELATED ART

Before now, computer systems requiring security for the data used in a computer had to be placed inside a locked room, requiring a user to leave his office and isolate himself inside the room, thus decreasing his productivity. Alternatively, special secure processors used control software to secure data and programs. These processors suffered severe performance degradation, increasing costs and decreasing usage of such systems.

A need has developed for a computer security system that need not be locked in a separate room, which provides equivalent performance and improved user productivity.

Typical computer system architectures allow the user processor unlimited access to data stored in memory or peripheral devices. Attempts at making a personal computer secure have included adding software and using 'custom' secured architectures. Software security measures are often circumvented by bypassing or patching the security software. Prior hardware security measures have been incompatible with standard computer architecture. The hardware security device of this invention, the Access Monitoring Unit (AMU), provides means for converting any general purpose personal computer, such as an IBM-AT, into a secure computer system.

In secure computer systems, computer memory is treated in different ways based upon the function of its contents. In this context, a "subject" is memory containing an active entity such as a program or device driver. The execution of a program or of a device driver causes information to flow among objects or changes the system state. An "object" is memory containing a passive entity such as a data base or a word processing file. Access to an object by a subject means that the subject's instructions can use and/or change the data in the object.

A domain is the unique context in which a program is operating, i.e. the set of objects that a subject can potentially access.

SUMMARY OF THE INVENTION

This invention provides a security system which adapts a conventional base computer system for high security use by addition of hardware and software. The hardware adds an access monitoring unit which continuously monitors all operations of the base computer CPU. The access monitoring unit specifies, for a given user, his read access and his write access to data stored in the system at that instant.

Functionally, the AMU intervenes between the base computer processor chip and the rest of the base CPU card. The AMU acts as a bridge between the user processor and other hardware in the system. The AMU monitors all traffic, i.e. all user accesses to and from the base computer. In combination with the security software, the AMU provides the hardware/software means to make any computer system secure.

The AMU monitors all processor cycles to the base computer memory or I/O addresses. In preferred embodiments, monitoring takes place at two levels of granularity. The AMU divides a base computer address space into pages. Each page can be monitored for any combination of read or write access or it may be monitored with a protection map. Protection maps further divide a page into words which can be individually monitored for read or write access. The security software loads the access monitor memory with the data which specifies the objects, or memory locations, which are accessible to the present user.

The AMU switches from treating the base computer bus memory as one large address space for user programs to one of a number of selectable address spaces. Selectable address spaces are used to provide distinguished domains in the base computer for execution of trusted subjects, i.e. subjects having a specific level of sensitivity.

Electrically, the AMU is located between the base computer CPU chip and the base computer memory control, bus, and support logic. In the preferred embodiment, the AMU hardware is located on the base computer CPU board. The AMU may be connected to an external security computer for execution of the security software.

This system has many advantages. No data passes over the base computer bus unless the base computer is being operated by an identified user with access to the requested data. Users who change or damage the base computer software portions of the security system still have no access to secure data since the security system validates all requests against an identified user even if the request originates from untrusted subjects.

The software components of a security system suitable for controlling an AMU might include: (a) security policy enforcing programs; and (b) access monitoring unit control programs. The software components can operate in an external security computer to provide performance equivalent to an unmodified computer.

In preferred embodiments of the security software, the security policy enforcing software audits security-relevant activities, maintains an auditable event table, and writes audit blocks to media in the security system. These tables and logs are maintained on storage devices as files. The security policy software also provides Discretionary Access Control functions, Mandatory Access Control Functions and type enforcement functions. The security policy enforcing software may also provide a labeling printer function to create hard copy output containing proper sensitivity labeling; a trusted path function to interact with the user for performing trusted path operations such as log-in and log-out; and session manager functions providing control over a user session.

The access monitoring unit software provides two functions, namely, object and subject map allocation, which determine the contents of the access memory; and an interface function for controlling the AMU.

BRIEF DESCRIPTION OF THE DRAWINGS

This invention can better be understood by reference to the drawings, in which.

DETAILED DESCRIPTION OF THE PREFERRED EMBODIMENTS

Figure 1:
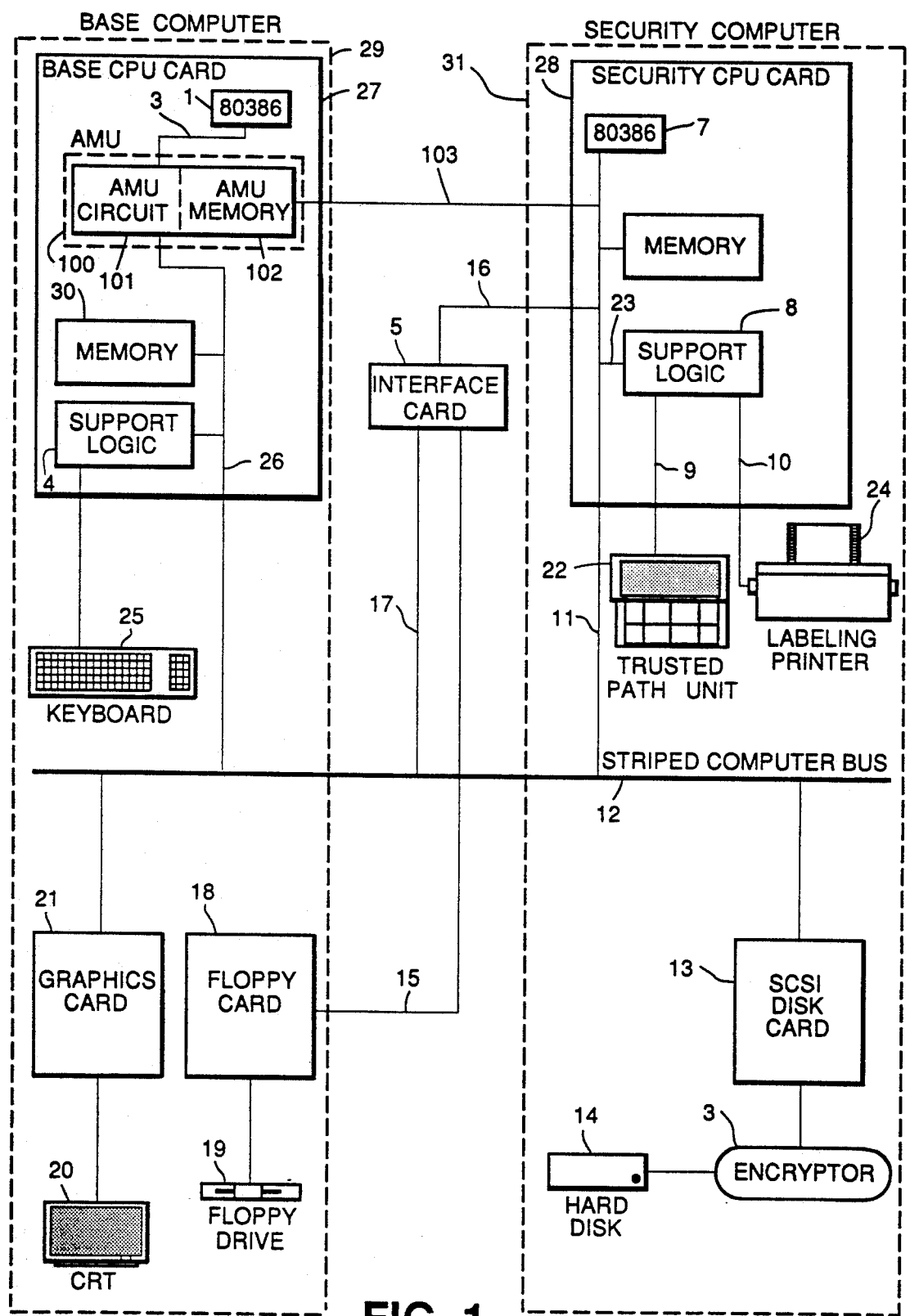
FIG. 1 shows an embodiment in block diagram form of a security system utilizing the AMU of this invention.

Referring to FIG. 1, base computer 29 is an IBM AT-type personal computer (PC), with conventional support logic 4 and memory 30.

Access monitoring unit 100 is linked to base computer CPU chip 1 via path 3. Typical support logic 4 may include ROM, clock circuitry, and general processor support logic. A port for keyboard 25 is also included in base CPU card 27.

AMU 100 provides for a known number, here 16 megabytes, of monitoring space, covering all locations in the memory map for 80386 chip 1. Monitoring takes place at two levels of granularity. The AMU divides the 16-megabyte CPU address base into a known number, here 4,096, of pages which results in pages of 4 kilobytes each. Each page can be monitored for any combination of read or write access, or the page can be monitored with a protection map. Protection maps further divide a page into a known number, here 1,024 long words, providing read and write access control to these 32-bit long words.

Figure 2B:
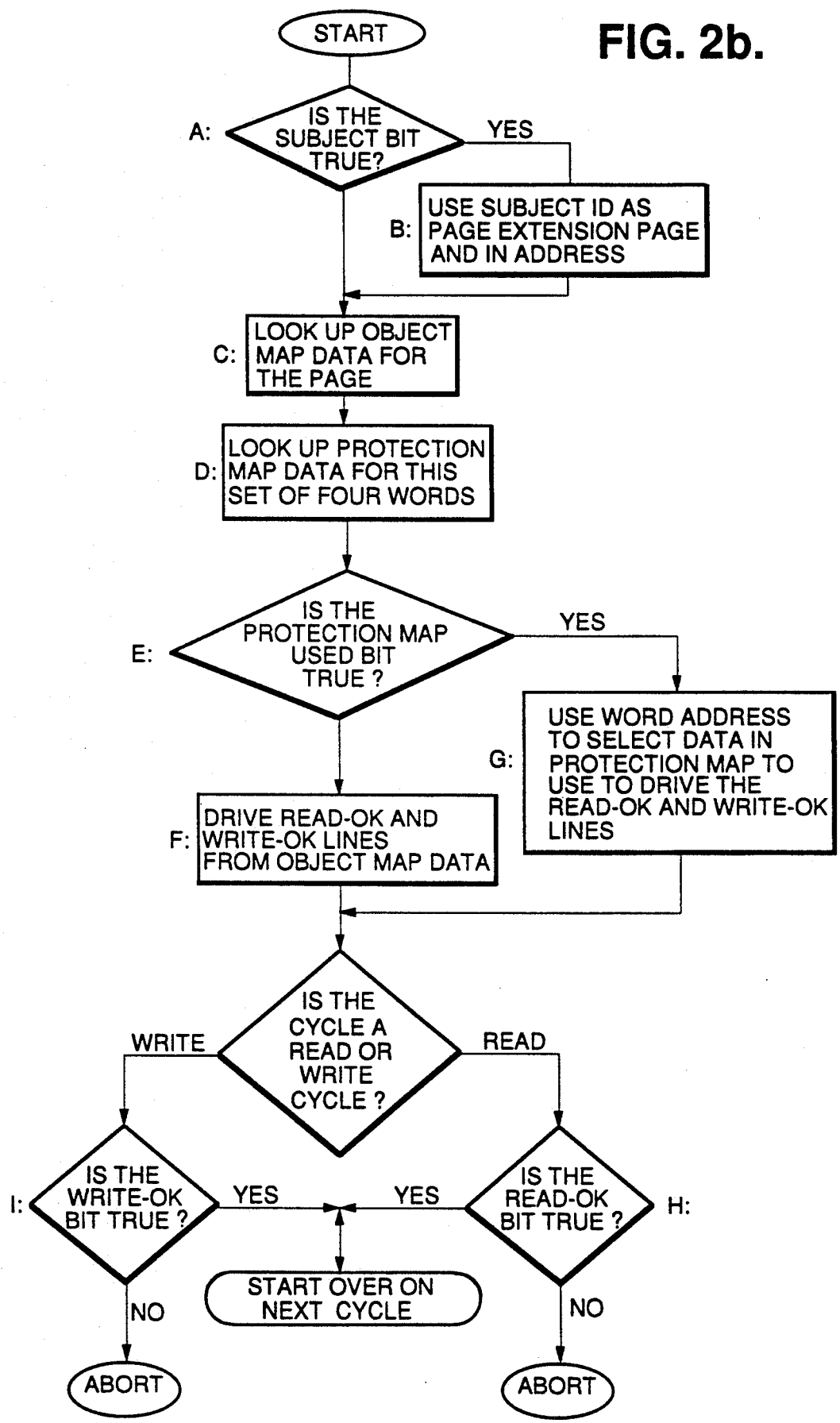
FIG. 2 consisting of 2A and 2B, shows an embodiment of look-up tables in the access monitor memory that forms part of the AMU of this invention.

The access monitor circuit is located between the 80386 chip 1 and its support logic 4 and bus 26, assuring an unbypassable reference monitor. FIG. 2A shows the AMU block diagram. FIG. 2B shows a flow chart depiction of the decision-making algorithms executed by the AMU. A: For every memory cycle executed by the 80386 chip 1, the subject register 201 provides control of the operating mode of the access monitoring unit. B: When the user/subject bit, 202, is true, the user page extension part 203 of the processor's address 204 is substituted with the subject ID bits 205 of the subject register 201 on the subject identification lines 206. C: The subject identification lines 206 and the page number part 207 of the processor's address 204 are used to access the object mapping RAM 208. The contents of the object mapping RAM 208, having been previously set by the access control software, define: in the first bit 209 whether or not a protection map is used; in the next two bits 210 page read and write access enable lines if no protection map is used; and, in the remaining bits 211, a protection map number, if a protection map is used. D: The protection map number 211 and the quad index part 212 of the processor's address 204 are used to access the protection map RAM 213. The contents of the protection map RAM 213, having been previously set by the access control software, define four sets of read and write access enable lines 214 which are decoded by the decoder 220 using the long word access part 218 of the processor's address 204 to produce the word access bits 219. E: If the protection map used bit 209 is FALSE, F: the least access circuitry 215 uses the logic signal appearing on the page read and write access enable lines 210 to drive outputs 216 and 217, G: otherwise the least access circuit 215 uses the word access bits 219 to drive outputs 216 and 217. H: If the memory cycle is a read cycle and the signal on the read OK line 216 is not true, then the cycle is aborted. I: If the memory cycle is a write cycle, and the signal on the write OK line 217 is not true, then the cycle is aborted.

The embodiment of the AMU shown in FIG. 2A can be modified to accommodate any size processor (8-bit, 32-bit, or wider). Additionally, the mapping table sizes can be modified as needed. It is also feasible to have the AMU table sizes dynamically allocated by means of control circuitry or software.

The security system utilizes software in a client-/server relationship. The base computer makes requests of the security software. The security software then services these requests and conveys the results to the base computer. From the base computer standpoint, the security software functions like a disk device subsystem.

The base computer system can, in preferred embodiments, use MS-DOS, O/S 2 or UNIX operating systems. Conventional operating system functions are presented with a security system-emulated operating system compatible file system. In preferred embodiments, other utility programs are provided for managing and displaying the security system's object attributes maintained by the security system.

The software in the security system includes two components, namely, security policy enforcing software and access control software.

The base computer software outside the security system includes operating system interface programs, utility programs, and user operating systems and applications.

Figure 3:
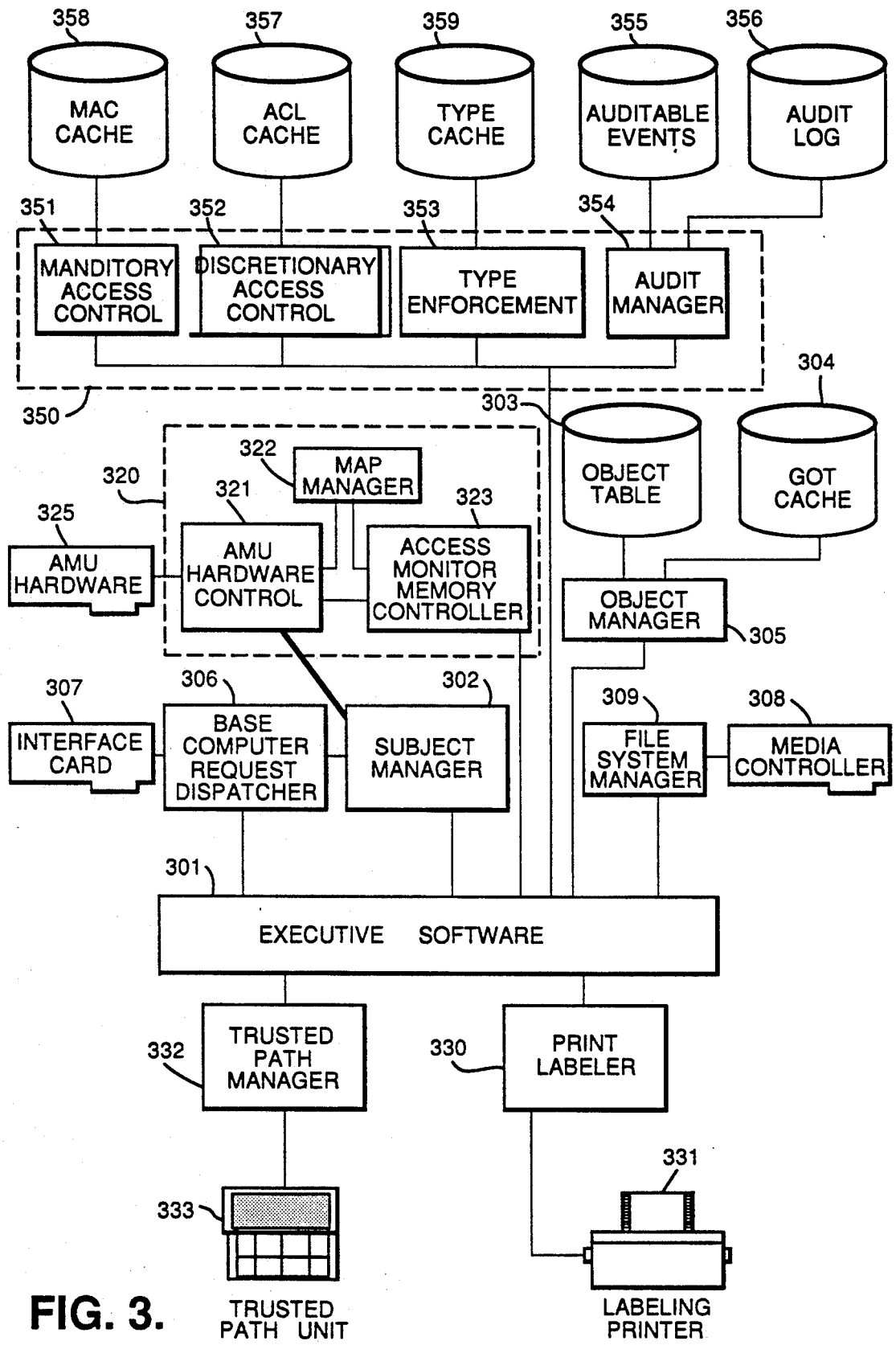
FIG. 3 shows a block diagram of the software components for a preferred embodiment of the security computer system of this invention.

FIG. 3 shows an overview of the security system software components. The executive software 301 provides a platform upon which the subjects of the system can execute. The executive software isolates the security system subjects from the hardware, and provides basic operating system services such as multi-tasking, intertask communication, memory management, interrupt dispatching, and fault handling.

Base computer programs can be considered separate subjects, or the entire base computer can be considered as one large subject. Each base computer subject operates in one of the 16 selectable address spaces provided by the access monitoring unit (AMU). The subject manager 302 controls the allocation of addressed spaces to subjects and the switching between address spaces as needed to execute the user application.

Objects are uniquely identified. The identifiers used to locate the object are global object table 303 (GOT) entries, which contain the access information for the object. For file system objects, the GOT is stored on suitable media, with a cache 304 of such entries kept in security computer memory by the object manager 305. For memory objects, GOT entries are created dynamically and placed in the GOT cache 304 by the object manager 305. The entries are not removed from the cache during the lifetime of the object, since memory object GOT entries have no disk-resident counterpart.

To illustrate how AMU tables are updated, consider that, when an existing object is referenced, the security enforcing functions use the GOT access information 303 provided by the object manager 305 via the executive 301 to determine what access to grant. When a new object is created, this access information defaults so that the creating subject has full access, and other subjects have no access. When an object is destroyed, its contents and associated GOT 303 entry are overridden to preclude reuse by a subsequent object creation. The object manager 305 is invoked by the base computer request dispatcher 306 through the executive 301 when the base subject performs operations to the interface card 307/5.

The security policy enforcing software 350 includes several functions. The audit function 354, for example, provides a single point for auditing security-relevant actions, and maintains an auditable event table 355 and writes audit blocks 356 to suitable media. The auditable event table and audit logs are kept on the storage devices as files. These files are written automatically so that a write to the audit log always performs a device output.

The Discretionary Access Control function 352 provides a single point for determining access rights based on access control lists. This function 352 maintains a cache of access control list data 357 for the most recently used objects. When it receives a request for discretionary access control rights of a subject to an object not in the discretionary access control function it gets the data from the object manager 305 via the executive 301.

The Mandatory Access Control function (MAC) 351 provides a single point for determining access rights based on security levels, and maintains a cache of security level data 358 for the most recently used objects. When MAC control 351 receives a request for the rights of a subject to an object not in the cache, the function 351 gets the data from the object manager 305 via the executive 301.

The type enforcement function 353 provides a single point for determining access rights based on domains and types, and maintains a cache of type data 359 for the most recently used objects. When this function 353 receives requests for type enforcement rights of a subject to an object not in the cache, the type enforcement function 351 gets the data from the object manager via the executive 301.

The access control software 320 provides the hardware referencing monitor functions of the system, and is responsible for configuring the AMU hardware 325/102 based on subject and object activity. The access control software includes three functions. The first function 321 controls operation of AMU hardware 325/102, and is invoked by messages from the subject manager 302 describing the currently active subject, or by illegal reference messages from the AMU 325/102. When a new subject becomes active, the first function loads the look-up tables and control registers of the AMU hardware 325/102. These values describe the address base restrictions imposed on the current subject. If the current subject causes an illegal reference to be detected by the AMU hardware 325/102, the first function 321 asks the subject manager 302 to destroy the current base subject and create a new one.

The object and subject map allocated determines the contents of each AMU segment and page-mapping table. The map manager 322 performs the function of assigning maps. When a base computer performs a context switch to another subject, the map allocated either selects the proper map tables from those already loaded into the mapping tables, or the second function 322 reloads the mapping tables to reflect the new base computer memory configuration.

The third function 32 is responsible for control of the access monitor memory. This controller 323 is invoked by load and control messages from the first function 321 or by interrupt messages from the security system executive 301 interrupt dispatcher. Request messages are converted to AMU look-up table values or control register values and sent to the AMU 321. Interrupt messages are converted into attention messages and sent to the first function 321.

Figure 4:
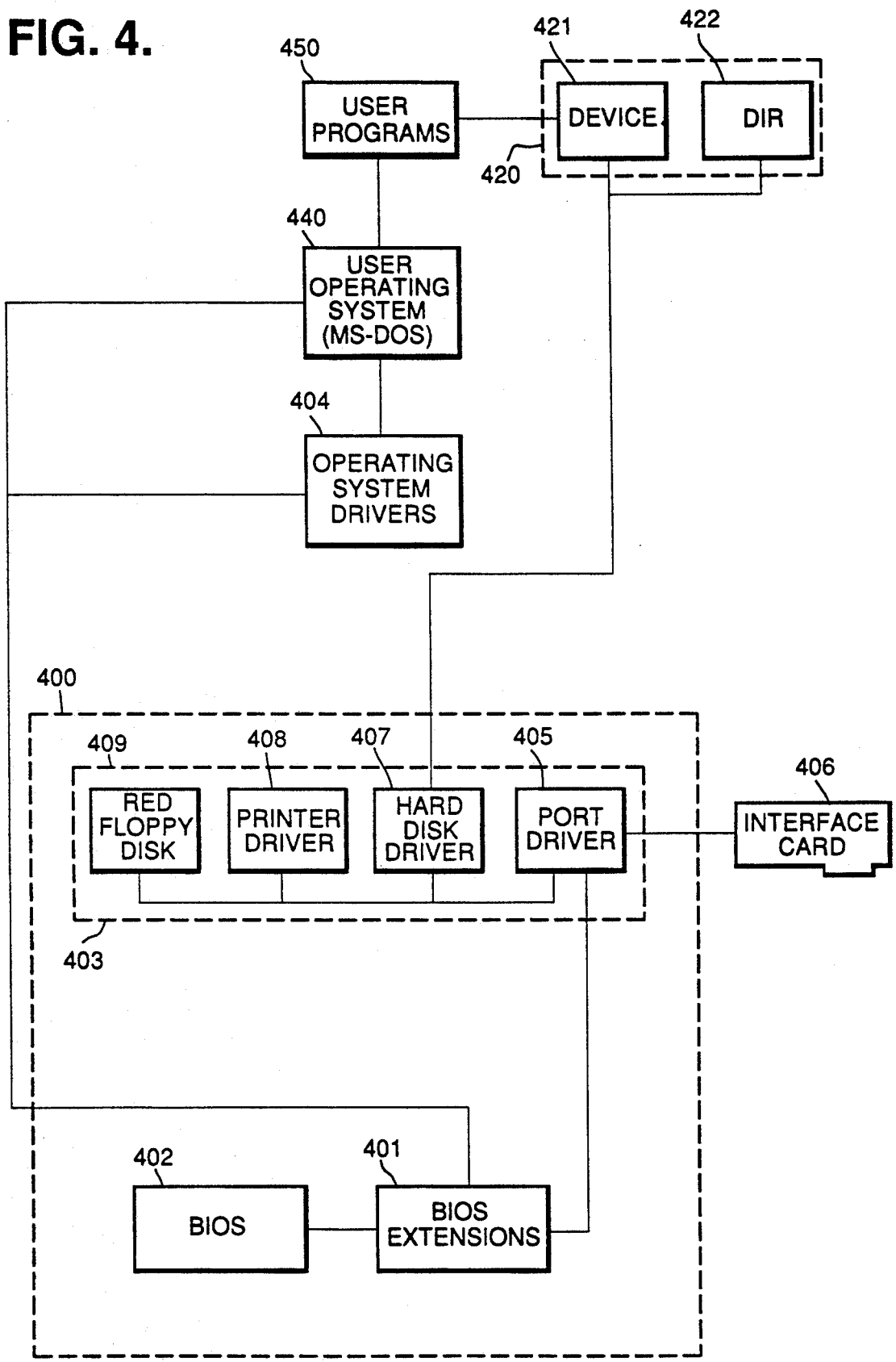
FIG. 4 shows a block diagram of the software components for a preferred embodiment of a base computer system with which the AMU and security computer system of this invention can be used.

FIG. 4 shows an overview of the base computer software components. The operating system interface software 400 provides the base computer with access to security system services in a manner transparent to user programs 450 operating on the base computer. This interface is provided at the basic input/output service and at the device driver level, and insures that user programs 450 can operate in this security system without modification.

The base computer operating system interface software 400 includes several functions. The base computer BIOS (basic input/output system) extensions 401 modify the standard BIOS 402 such that base computer calls to BIOS functions are translated into requests to the security system for the required service. In the preferred embodiment, the BIOS 402 used for the system is based on the standard portable BIOS provided by Microsoft under license. Extensions to this BIOS 401 are primarily in the boot-up and storage device access routines. The BIOS routines 401/402 are used by both operating system 440 and application programs 450 used on the base computer.

The base computer installable device drivers 403 are used to present an operating system compatible interface to devices actually controlled by the security system. There are several such devices. The port driver 405 is the only base computer software that interacts directly with the security system. The port driver 405 passes service requests from the base software 440 or 401 to the security system computer via the dual-port mailbox memory 406 provided in the base computer to the security system interface card 5. When the request completes, status is returned by the port driver 405 to the requesting program 440 or 401. The port driver 403 provides a single consistent interface to the security system for use by the BIOS extensions 401 and other installable device drives 403.

Hard disk drivers 407 provide the standard disk drive devices used by base computer programs 440/450. These device drivers present the operating system 440 with the expected disk device interface used by MS-DOS. These drivers 407 translate all disk I/O requests from the base computer into security system service requests. These requests are passed to the security system via the port device driver 405.

The red floppy disk driver 409 provides access to a disk device directly connected to the base computer. Data written to this floppy device is not encrypted. This device driver 409 operates identically to any standard floppy disk driver 404, except that the disk input/output request is passed to the security system for validation and auditing. If the security system determines that the request is allowable, the red floppy driver 409 will enable the red floppy disk-write circuit.

The printer driver 408 provides the base computer with a standard printer device interface. Data sent to this printer device is passed to the security system for printing. The security system printer 330 adds sensitivity labels to the data before printing the data.

The base computer utility programs 420 are those normally supplied with the operating system that requires changes to operate correctly with the security system. For example, in the preferred embodiment, DEVICE 421 is a system configuration command used to load device drivers. When a driver is loaded, the security system is notified. If access is granted, the driver is loaded and treated as a separate subject.

What is claimed is:

1. A security system for use with a computer system having a processing unit and memory comprising:
    an access monitor unit connected between the processing unit and the memory of said computer system for continuously monitoring all operations between the memory and the processing unit of the computer system;
    security means for controlling the operation of said access monitoring unit to allow or deny access to the memory by the processing unit based on predefined security conditions; and
    security computer means communicating with said access monitoring unit for implementing said security means and controlling said access monitoring unit.

2. The security system of claim 1 wherein said access monitoring unit includes access monitor memory tables which specify, for a given user, his read access and write access to data stored in the computer system.

3. The security system of claim 1 wherein said security computer means includes means for associating, with each data subject or object within the memory, data specifying an authorized user.

4. The security system of claim 1 wherein said security computer means is remotely located from said computer system.

5. A security system for use with a computer having a processing unit, memory and a plurality of input/output device drivers comprising access monitoring means for continuously monitoring all operations between the processing unit and the memory, as well as between the processing unit and the input/output device drivers of the computer;
    wherein said access monitoring means comprises an access monitoring unit connected between said processing unit and said memory and said input/output device drivers; and
    security means for controlling the operation of said access monitoring unit to allow or deny access by the processing unit to the memory or input/output device drivers based on predefined security conditions; and
    further comprising security computer means communicating with said access monitoring unit for implementing said security means and controlling said access monitoring unit.

6. The security system of claim 5 wherein said access monitoring unit includes access monitor memory tables which specify, for a given user, his read access and write access to data stored in the computer system.

7. The security system of claim 5 wherein said security computer means includes means for associating, with each data subject or object within the memory, data specifying an authorized user.

8. The security system of claim 5 wherein said security computer means is isolated from said computer system.

* * * * *